July 16, 1968      J. L. STANLEY      3,392,786

HOOF TRIMMER

Filed July 29, 1966

INVENTOR.
JOHN L. STANLEY

BY *Kimmel, Crowell & Weaver*

ATTORNEYS.

United States Patent Office 3,392,786
Patented July 16, 1968

3,392,786
HOOF TRIMMER
John L. Stanley, R.D. 1, Atglen, Pa. 19310
Filed July 29, 1966, Ser. No. 568,907
11 Claims. (Cl. 168—48)

This invention relates to hoof trimmers and more particularly to a device for trimming the hoofs of farm animals.

The forward end of hoofs of certain animals, for example cattle, "grow" much like the finger nails and toe nails of humans. When such animals are allowed to roam freely the amount of hoof growth is compensated by the amount of wear on the hoof from contact with the underlying ground surface. When cattle or other similar animals are wintered in a bar or other restricted area, the animal does not move about enough to wear down the growing hoof.

Since it is the forward portion of the hoof that grows, a long hoofed cow will tend to walk on its heel rather than up on the toe of the hoof. Since the makeup of the cow's leg is adapted to support the animal when it is walking on its toe, long hoofs will tend to produce strained ankles and sore legs in the animal. In addition, the under side of the animal's hoof tends to become infected if the long hoofs remain. It should be evident that these results accrue whenever the animal becomes long hoofed and is not limited to the causal circumstances mentioned.

Various types of hoof trimming devices are known in the prior art including hand operated scissors-type shears. The difficulty with this type of hoof trimming device is that the animal's legs must be raised and held steady while the trimming operation is conducted. Because the holding of the hoof in a generally horizontal plane is an abnormal condition, the animal often becomes skiddish and takes other objection to the trimming of its hoofs. Another type of hoof trimming device of the prior art is shown in U.S. Patent 343,427, issued to Bernadac. Because of Bernadac's constructions it will be evident that the animal's hoof must be accurately placed before the cutting operation can begin. It will also be evident that the hook-shaped arms of Bernadac will be bent to an unusable condition if the animal steps thereon.

The device of the instant invention obviates the disadvantages of prior art hoof trimming devices in several different ways. The necessity of holding the animal's leg in a substantially horizontal plane is obviated by providing a horizontal platform on which the animal's hoof may rest during the trimming operation. By mounting the blade of the instant invention for selective rotary movement to a multiplicity of positions about an upstanding axis obviates the need for the construction shown by Bernadac. In addition, providing means mounting the blade for lateral adjustment to a multiplicity of positions along the lateral extent of the platform allows the trimming operation to be conducted without placing the animal's hoof in an exact predetermined location.

Structurally, the device of the instant invention is an animal hoof trimmer of the type including a generally horizontal platform and an up and down moving blade cutting the hoof against the platform, including means mounting the blade for selective rotary movement to a multiplicity of positions about an upstanding axis for trimming different parts of the animal's hoof while the animal is stationary. Alternatively, the instant invention may be structurally defined as including a generally horizontal platform carrying an upstanding standard, a force applying arm mounted on the standard for pivotal movement in a generally vertical plane, and a blade secured to the force applying arm for selective rotary movement about an upstanding axis for trimming different parts of the animal's hoof while the animal is stationary.

It is an object of the instant invention to provide an animal hoof trimmer of the type including a generally horizontal platform and means mounting a cutting blade for generally up and down movement wherein the animal's hoof can be trimmed when placed in a multiplicity of positions on the platform.

Another object of the instant invention is to provide an animal hoof trimmer of the character described wherein the cutting blade is mounted for rotation about an upstanding axis for trimming different parts of the animal's hoof while the animal is stationary.

Still another object of the instant invention is to provide a hoof trimmer which may be used with either curved or straight cutting blades to cut different parts of the animal's hoof.

A still further object of the instant invention is to provide an animal hoof trimmer including a cutting blade carried by a force applying lever with the lever being adjustable to vary the moment arm and consequently vary the force applied to the cutting blade.

Other objects and advantages of the instant invention reside in the combinations of elements, arrangements of parts, and features of construction and operation, all of which will be more fully described hereinafter and disclosed in the accompanying drawing wherein there is shown a preferred embodiment of this inventive concept.

Figure 1:
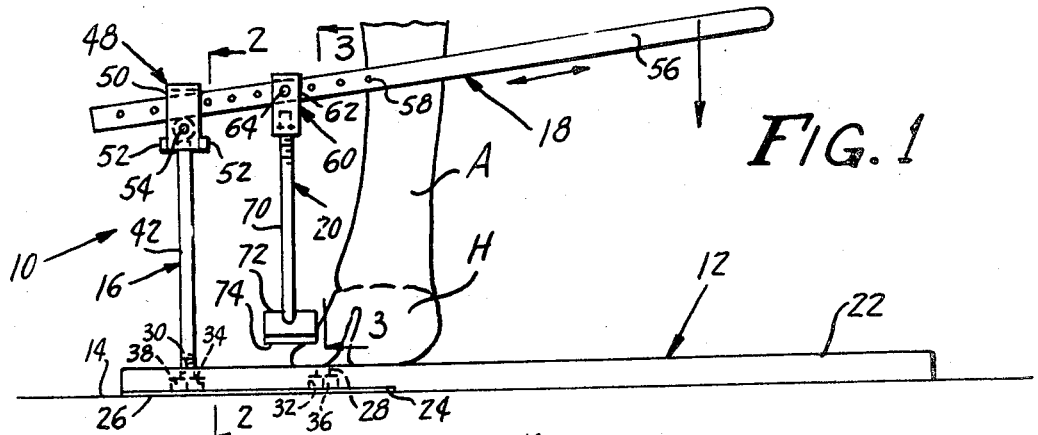
FIGURE 1 is a side elevational view of the hoof trimming device of the instant invention illustrating the force applying arm as a second class lever.

Referring now to the drawing in detail, wherein like reference characters designate like elements throughout the several views thereof, the hoof trimming device of the instant invention is shown generally at 10 and has as its major components a platform designated generally at 12 supported on an underlying surface 14, an upstanding standard illustrated generally at 16, a force applying arm shown generally at 18 mounted on the upper end of standard 16 for generally up and down movement and a cutter assembly denominated generally at 20 secured to arm 18. As will be explained more fully hereinafter, arm 18 is slidably received by the upper end of standard 16 to provide a releasable and adjustable connection therebetween for disassembling device 10 for convenient movement. When it is desired to trim the hoof H of a farm animal A, such as a cow or the like, the individual removes arm 18 from standard 16 and places platform 12 under hoof H. It is preferred that the hoof trimming operation be conducted during a period in which the animal is relatively still, such as may occur during feeding.

After the animal's hoof has been placed on platform 12, the individual reinserts arm 18 into the upper end of standard 16 and adjusts the position thereof to place cutting assembly 20 immediately above hoof H. As will be explained more fully hereinafter, the individual then rotates cutting assembly 20 about a vertical axis to position the cutting blade at the desired place to trim the animal's hoof. By applying a downward force on the outer end of arm 18, cutting assembly 20 is also depressed and acts against platform 12 to trim the animal's hoof.

Because the blade of assembly 40 is necessarily not adapted to cut the entire hoof in one stroke of arm 18, assembly 20 is rotated upon successive depressions of arm 18 to trim the front and sides of hoof H. Since arm 18 is slidably adjustable with respect to standard 16 and since assembly 20 is rotatably adjusted about a vertical axis, it will be evident that the animal's foot need not be moved during the trimming operation.

It has been found that many advantages accrue in the use of the hoof trimming device of the instant invention since the animal is standing in a normal resting position. Since the hoof trimming operation is preferably done during feeding, the animal remains relatively stationary and is given no cause for alarm during the activity. Because of the adjustability of arm 18 and cutter assembly 20, it will be seen that the hoof need not be positioned on platform 12 with great accuracy. Since it is not required to place the animal's hoof in an exact position, there is no need to move the animal from place to place when the hoof is placed on platform 12. This in turn aids in keeping the animal quiet during the trimming operation.

Platform 12 is comprised of a plate 22 of a conventional material and is preferably wooden to minimize cost and to allow convenient handling. A cutout 24 is formed at one end of plate 22 for receiving a metal plate 26 for purposes more fully explained hereinafter. A pair of nonthreaded apertures 28, 30 extend vertically through plate 22 and have an enlarged lower end 32, 34 receiving a threaded nut 36, 38 for threadably receiving the lower end of standard 16. Nuts 36, 38 are preferably secured, as by welding or the like, to metal plate 26 which is affixed in cutout 24 by a plurality of frictional fasteners 40, such as nails, screws or the like. It will be apparent that platform 12 is substantially planar on the bottom surface thereof to rest on ground surface 14 in a stable manner.

Standard 16 includes a shank 42 which is illustrated as substantially straight, but which may be of any desired configuration, carrying a cross bar 44 at the upper end thereof forming a passage 46 therethrough. A connector shown generally at 48 comprises an inverted U-shaped bail 50 having the lower ends connected by a pair of substantially transverse bars 52 as shown best in FIGURES 1 and 2. Bail 50 forms a pair of aligned apertures receiving a removable pin 54 for securing connector 48 to standard 16. It will be readily apparent that connector 48 is rotatable with standard 16 when shank 42 is threadably engaged or disengaged in nut 38. Since bars 52 are spaced slightly from shank 42, it will be evident that connector 48 allows a certain amount of pivotal movement about the axis of pin 54.

Force applying arm 18 is illustrated as a generally tubular section 56 having a plurality of apertures 58 extending therethrough. An important feature of the instant invention resides in the sliding adjustable connection between arm 18 and connector 48 such that the moment arm of device 10 may be altered merely by sliding arm 18 through the passageway provided by U-shaped bail 50. Although a pin connection may be used between connector 48 and arm 18, the sliding arrangement illustrated has proved more desirable since the moment arm can be varied through an infinite number of positions between a maximum and minimum length. In addition, the sliding adjustment is more desirable since it is the simpler of the two connections and does not require the removal of pivot pins or the like.

Figures 2, 3, 4, 5:
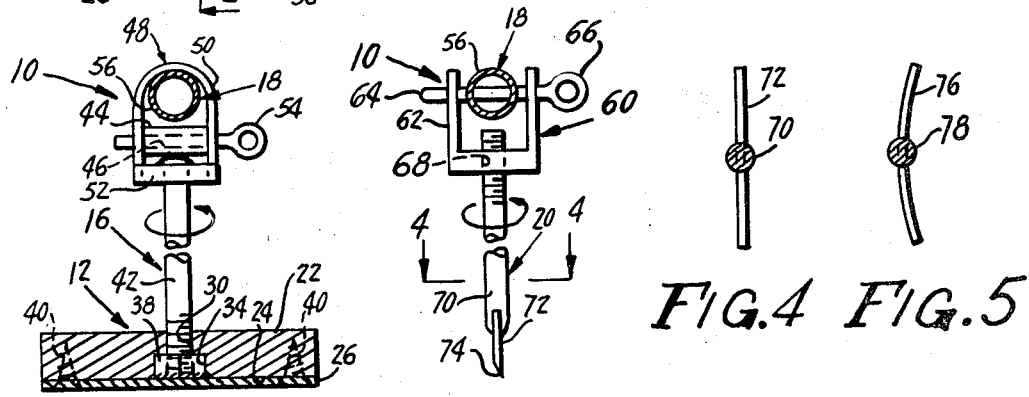
FIGURE 2 is a transverse cross sectional view of the hoof trimmer of FIGURE 1 taken substantially along line 2—2 thereof as viewed in the direction indicated by the arrows.
FIGURE 3 is another transverse cross sectional view of the hoof trimmer of FIGURE 1 taken substantially along line 3—3 thereof as viewed in the direction indicated by the arrows.
FIGURE 4 is a horizontal cross sectional view of the hoof trimming device of FIGURES 1 to 3 inclusive, taken substantially along line 4—4 of FIGURE 3 as viewed in the direction indicated by the arrows.
FIGURE 5 is a view similar to FIGURE 4 illustrating the cutting blade as being arcuate in configuration.
Figure 6:
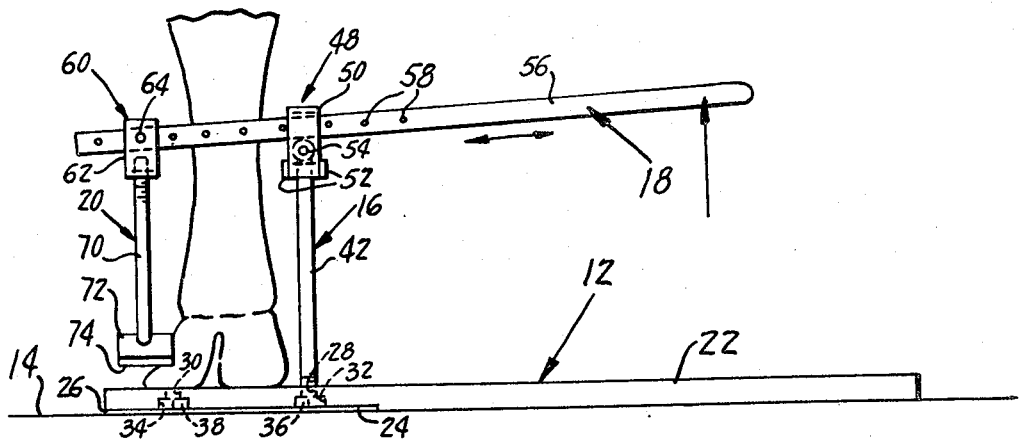
FIGURE 6 is a side elevational view of another form of hoof trimming device of the instant invention illustrating the force applying arm as a first class lever.

As shown by comparison of FIGURES 1 and 6, force applying arm 18 may be configured either as a second class lever or as a first class lever depending upon the exigencies of the situation. Although arm 18 has been illustrated as a simple lever, it should be apparent that a double acting lever or other more complicated lever arrangements may be used. It should also be evident that arm 18 may be rotated by applying a lateral force thereto to threadably engage or disengage shank 42 in nut 38 to position cutting assembly 20 at the desired lateral position on platform 12.

Cutting assembly 20 includes a connector shown generally at 60 comprised of an upright U-shaped bail 62 forming a pair of aligned apertures 64 receiving a removable pin 66 securing connector 60 in a selected aperture 58 in arm 56. The transverse portion of bail 62 forms a threaded aperture 68 receiving the upper threaded end of a shank 70 which carries a conventional cutting blade 72 on the lower end thereof. Cutting blade 72 is illustrated as a straight member forming a one bevel edge 74 for trimming purposes. It has been found desirable to place the bevel of blade 72 away from the hoof during the cutting operation so that a clean cut is made on hoof H. Straight blade 72 has been found desirable in use when cutting between the toes and along the side edges of hoof H. In order to trim the arcuate front edge of hoof H, an arcuate blade 76 is provided. Blade 76 is permanently affixed to another threaded shank 78 which is engageable with aperture 68 upon the removal of shank 70.

Before starting the hoof trimming operation, it is desirable that the animal be quieted and it is preferred that the operation be conducted during the animal's feeding. Force applying arm 18 is preferably removed from connector 48 with platform 12 being inserted between the animal's hoof and the underlying ground surface. As previously mentioned, no particular effort need be made to place the animal's hoof in an exact position because of the adjustments allowed by connection 48 and cutting assembly 20. After the animal's hoof rests on platform 12, the individual inserts arm 18 into connector 48 and rotates shank 70 to position cutting blade 72 at the desired position. By pressing down on arm 18 in the configuration of FIGURE 1, or by pulling upwardly on arm 18 in the configuration of FIGURE 6, blade 72 is forced against platform 12 to trim the desired portion of the hoof.

After the first up and down movement of arm 18, shank 70 is rotated slightly and arm 18 is reciprocated through connector 48 to place blade 72 in the next position to be trimmed. It will be evident that a series of individual cutting operations is needed to complete the cutting operation and may be quickly and expeditiously accomplished. After one hoof is trimmed, the animal's leg will be raised and platform 12 removed from beneath hoof H to perform another trimming operation on the remaining hoofs.

It is now seen that there is herein provided an improved hoof trimming device which accomplishes all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in limiting sense.

I claim:

1. In an animal hoof trimmer of the type including a generally horizontal platform and an up and down moving blade for cutting the hoof against the platform, a means mounting the blade on the platform for selective rotary and vertical movement to a multiplicity of positions about an upstanding axis for trimming different parts of the animal's hoof while the animal is stationary.

2. The hoof trimmer of claim 1 further including means mounting the blade for lateral adjustment to a multiplicity of positions along the lateral extent of the platform.

3. The hoof trimmer of claim 2 wherein the blade is arcuate.

4. The hoof trimmer of claim 2 wherein the blade is substantially straight.

5. The hoof trimming device of claim 2 wherein the trimmer is of the type wherein the blade is linearly adjustably mounted toward and away from a predetermined point.

6. A trimmer for animal hoofs comprising a generally horizontal platform;
    an upstanding standard on the platform;
    a force applying arm;
    means mounting the arm on the standard for pivotal movement in a generally vertical plane; and
    a cutter assembly including
        a blade having a generally vertical cutting edge; and
        means connecting the blade to the force applying arm at a point spaced from the mounting means, the connecting means including means mounting the blade for selective rotary movement about an upstanding axis for trimming different parts of the animal's hoof while the animal is stationary.

7. The hoof trimmer of claim 6 wherein the arm mounting means includes means adjustably receiving the arm on the standard for varying the moment arm to alter the force applied to the blade.

8. The hoof trimmer of claim 7 wherein the adjustable means comprises means for infinitely varying the moment arm between a maximum and a minimum length.

9. The hoof trimmer of claim 6 wherein the arm mounting means includes a U-shaped bail mounted on the standard in an inverted position, the force applying arm being slidably mounted in the bail.

10. The hoof trimmer of claim 6 wherein the blade connecting means includes
    a threaded shank secured to the blade; and
    means on the arm, threadably receiving the shank.

11. The hoof trimmer of claim 6 wherein the standard includes means carrying the arm for pivotal movement in a generally horizontal plane for positioning the blade in a multiplicity of positions along the lateral extent of the platform.

References Cited
UNITED STATES PATENTS

| | | | |
|---|---|---|---|
| 17,441 | 6/1857 | Mitchell | 168—48 |
| 241,942 | 5/1881 | Denton | 168—48 |
| 363,256 | 5/1887 | Parrish | 168—48 |
| 1,337,571 | 4/1920 | Stokes | 168—48 |
| 2,075,793 | 4/1937 | Deal | 168—48 |

ALDRICH F. MEDBERY, *Primary Examiner.*